Figure 1:
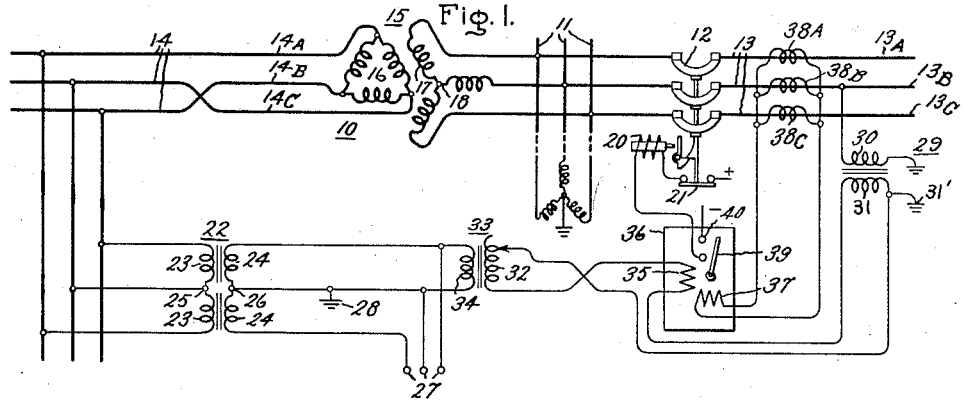

June 19, 1945.  H. T. SEELEY  2,378,800
PROTECTIVE SYSTEM
Filed Nov. 28, 1942   3 Sheets-Sheet 1

Inventor:
Harold T. Seeley,
by Harry E. Dunham
His Attorney.

June 19, 1945. H. T. SEELEY 2,378,800
PROTECTIVE SYSTEM
Filed Nov. 28, 1942    3 Sheets-Sheet 2
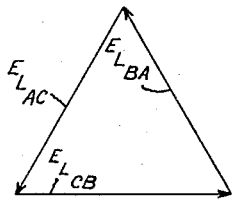
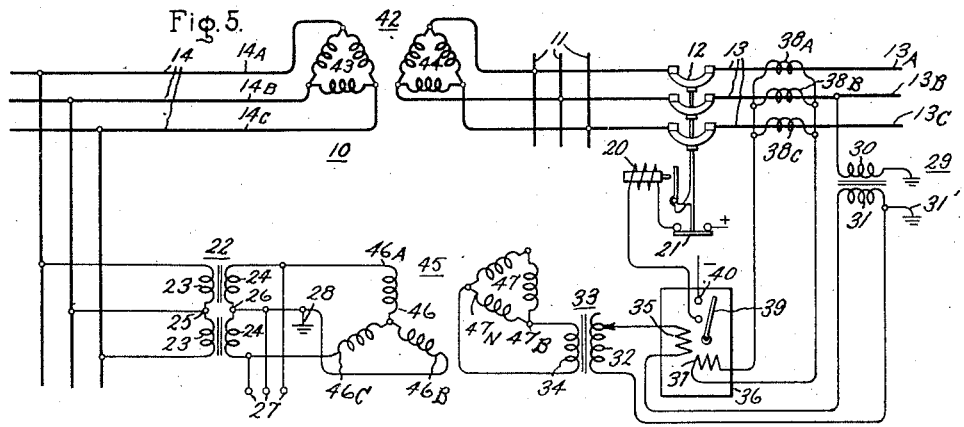
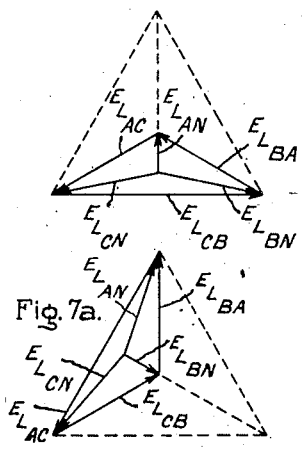
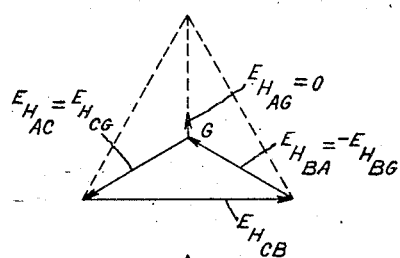
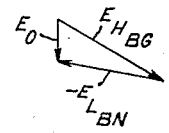
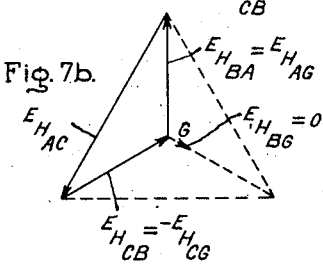
Inventor:
Harold T. Seeley,
by Harry E. Dunham
His Attorney June 19, 1945.    H. T. SEELEY    2,378,800
PROTECTIVE SYSTEM
Filed Nov. 28, 1942    3 Sheets-Sheet 3

Inventor:
Harold T. Seeley,
by Harry E. Dunham
His Attorney.

Patented June 19, 1945

2,378,800

UNITED STATES PATENT OFFICE 2,378,800

PROTECTIVE SYSTEM

Harold T. Seeley, Lansdowne, Pa., assignor to General Electric Company, a corporation of New York Application November 28, 1942, Serial No. 467,184

15 Claims. (Cl. 175—294)

My invention relates to a protective system and more particularly to means for obtaining ground fault relaying quantities from a protective system which has readily available only phase fault relaying quantities.

Alternating current systems are often provided with protective means for protecting them against faults not involving ground. Quite often these same systems are also provided with ground fault protection which is usually separate and independent from the protection against phase faults. Sometimes, when only one of the two kinds of protection is afforded, that kind will be phase fault protection. Often, in such cases, it subsequently becomes desirable to add ground fault protection and my invention is particularly concerned with simple and economical means for subsequently providing such ground fault protection on a system which heretofore was arranged to afford only phase fault protection.

Many polyphase alternating current systems comprise a portion operated at a high potential and a portion operated at a considerably lower potential, the two portions being related by a transformer or the like. Where such transformer has at least one delta connected winding, it is not possible to obtain zero sequence quantities on the low potential side which correspond to zero sequence quantities on the high potential side due to a ground fault on the high potential side of the transformer. Accordingly, it would be desirable to provide means for obtaining ground fault relaying quantities or zero sequence quantities mainly from the low potential side of the transformer which, with a minimum of equipment, would represent certain zero sequence quantities existing on the high potential side, so that inexpensive ground fault protection for the system could be provided even though the transformer has at least one delta connected winding.

It is an object of my invention, therefore, to provide a new and improved means for obtaining with a minimum of additional equipment, ground fault relaying quantities or zero sequence quantities from an electric circuit which is equipped to give protection only against faults not involving ground.

It is another object of my invention to provide a protective system for a polyphase alternating current circuit including a portion operated at a relatively high potential and a portion operated at a relatively low potential, interrelated by means of an electric translating apparatus having at least one delta connected winding, wherein ground fault relaying quantities may be obtained mainly from the relatively low potential portion of the circuit for protecting against ground faults on the high potential portion with a minimum of additional equipment and in a satisfactory and economical manner.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Fig. 1 is a schematic diagram of a protective system embodying my invention; Figs. 2a, 2b, 2c, 3a, 3b, 3c, 4a, 4b, and 4c are vector diagrams to aid in understanding the operation of the protective system of Fig. 1; Fig. 5 is a schematic diagram of a modification of my invention; Figs. 6a, 6b, 6c, 7a, 7b, 7c, 8a, 8b, and 8c are vector diagrams to aid in understanding the operation of the protective system of Fig. 5, and Figs. 9, 10, and 11 are schematic diagrams of protective systems embodying modifications of my invention.

Referring now to Fig. 1 of the drawings, I have illustrated my invention as applied to protecting a polyphase alternating current circuit, generally indicated at 10. Circuit 10 is illustrated as comprising a high potential portion or bus 11 connected to supply a plurality of high potential circuits, such as transmission line 13, only one of which is shown in Fig. 1. Circuit 13 is illustrated as being connected to bus 11 through a circuit interrupting means 12. Bus 11, on the other hand, is connected to a portion of circuit 10 indicated at 14 operated at a potential somewhat lower than the potential of portion 13 or bus 11. The high potential portion or transmission line 13 comprises three phase conductors 13A, 13B, and 13C, respectively, while the low potential portion comprises corresponding phase conductors 14A, 14B, and 14C, respectively. The two portions of the circuit 10 are interconnected by an electric translating apparatus, generally indicated at 15. Electric translating apparatus 15 is illustrated as a transformer having at least one delta connected winding 16 specifically illustrated in Fig. 1 as the low potential winding connected to the low potential portion 14 of the circuit 10 and a star or wye-connected winding 17 connected with the high potential portion 13 of the circuit 10. The high potential circuit is assumed to be grounded at the neutral of a transformer in some other station, but not at the neutral of transformer 15. It is also assumed, as was mentioned above, that one or more other high potential circuits such as transmission line 13 above are connected to bus 11 and fed from the same transformer 15. In order to isolate a portion of the circuit 10 in the event of a ground fault condition on the high potential portion thereof, I provide means for causing operation of circuit-interrupting means 12 as will be described hereinafter. Circuit-interrupting means 12 is illustrated as a latched closed circuit breaker having a trip coil 20 and an "a" switch 21 which is closed when the circuit breaker is closed and open when the circuit breaker is open.

In order to protect portions of a circuit, such as 10, against the occurrence of faults other than those involving ground, it has been customary heretofore to provide a so-called "open delta" potential transformer, such as 22, which in reality is two single phase transformers, each having a primary winding 23 and a secondary winding 24. The primary windings 23 have a common terminal 25 while the secondary windings have a common terminal 26. The primary windings 23 are connected so as to be energized with the line-to-line potentials of the low potential portion of circuit 10 so that line-to-line voltages may be obtained across the terminals 27 of the secondary windings 24 of open delta transformer 22. It has also been customary heretofore to ground the common middle terminal 26 of the secondary windings 24 of the open delta potential transformer as indicated at 28. The potentials existing at the terminals 27 were used heretofore to operate suitable phase fault relays which required voltage quantities and also for metering purposes.

It will be obvious that zero sequence voltage quantities are not obtainable from the arrangement described thus far without adding additional equipment such as a wye-wye potential transformer. Furthermore, since electric translating apparatus 15 includes one delta connected winding 16, if it is desired for relaying purposes to obtain zero sequence voltage quantities proportional to those which exist in transmission line 13, a relatively expensive, high voltage potential transformer is required. Quite often, in such systems, a single phase high potential transformer, such as is generally indicated at 29, is provided for synchronizing purposes and comprises a primary winding 30 and a secondary winding 31. The primary winding 30 has one terminal thereof connected to one phase conductor, such as 13B, of transmission line 13 while the other terminal thereof is connected to ground so that a potential proportional to the line-to-ground potential of high potential transmission line 13 is obtained across secondary winding 31, which may also have one terminal thereof grounded as indicated at 31'. My invention is particularly concerned with means for obtaining zero sequence voltage quantities proportional to those existing in transmission line 13 with substantially no additional equipment over that already described.

I have found that, with the addition of a single phase, high potential transformer 29, if it is not already present as mentioned above, zero sequence voltage relaying quantities may be obtained for operating a ground fault relay, for example in response to ground faults appearing on the high potential portion such as 13 of circuit 10. By vectorially adding to the instantaneous line-to-ground potential $E_{H_{BG}}$ obtained across winding 31 of potential transformer 29 a predetermined line-to-line potential obtained from open delta potential transformer 22, I find that a potential proportional to the zero sequence potential existing in transmission line 13 is obtained. If the predetermined line-to-ground potential $E_{H_{BG}}$ is chosen where the subscript H denotes the high potential portion 13 of circuit 10 and BG refers to the B phase conductor and ground, then the predetermined line-to-line potential obtained from open delta transformer 22, which should be vectorially added thereto, is $E_{L_{BC}}$ or $-E_{L_{CB}}$, where the subscript L denotes the low potential portion 14 of the circuit 10 and BC refers to the phase conductors B and C. To perform this vectorial addition of the voltages $E_{H_{BG}}$ and $E_{L_{BC}}$, I connect the secondary winding 31 of potential transformer 29 in series with the secondary winding 32 of an adjusting transformer 33 whose primary winding 34 is energized with the potential $E_{L_{BC}}$ or $-E_{L_{CB}}$ by being connected to the appropriate terminals of the secondary windings 24 of open delta transformer 22. The secondary winding 32 of adjusting transformer 33 is preferably adjustable as indicated in Fig. 1 to adjust for the different transformation ratios of transformers 15, 22 and 29. It will be obvious to those skilled in the art that the adjusting transformer 33 may be eliminated in those situations where it is not necessary for bringing about equality of magnitudes of the voltage quantities to be added. For example, if the product of the ratios of transformation of transformers 15 and 22 are exactly equal to the ratio of transformation of transformer 29, adjusting transformer 33 may be omitted.

The resultant voltage quantity obtained by vectorially adding the output of transformers 29 and 33 is impressed across the winding 35 of a suitabel ground fault relay 36. It will be obvious that relay 36 may comprise any conventional type of electroresponsive device. However, I have chosen to illustrate relay 36 as of wattmetric type having, in addition to winding 35, a winding 37 which may be energized with a zero sequence current quantity obtained from the secondary windings of current transformers 38A, 38B, and 38C which have their secondary windings connected in parallel. Energization of the windings 35 and 37 of wattmetric relay 36 will produce a torque on a movable contact controlling element 39 designed to control or bridge contacts 40 connected in series with trip coil 20, "a" switch 21, and a suitable source of control potential. Bridging of contacts 40 by contact controlling member 39 will cause energization of trip coil 20 and consequent tripping of circuit breaker 12. As will become apparent from the following description, the arrangement described above will enable one, with no additional equipment if potential transformer 29 has already been provided for synchronizing purposes or if it has not been provided, with the addition of one high potential transformer of the single phase type, to obtain zero sequence relaying quantities proportional to the zero sequence voltage quantities existing on the high potential portion of the circuit 10 by utilizing existing potential transformer installations on the low potential portion 14 which were provided to obtain line-to-line voltage quantities therefrom.

Figure 2A:
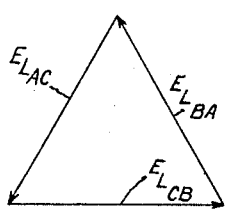
Figure 2B:
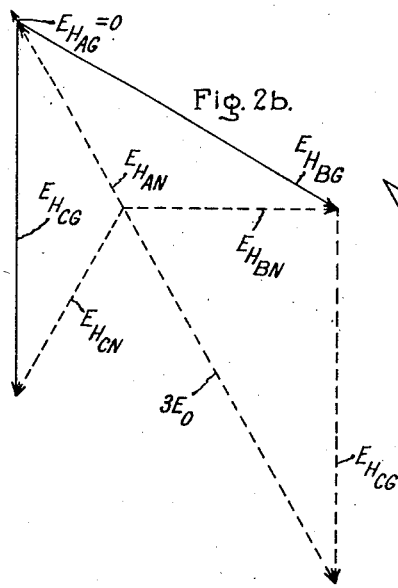
Figure 2C:
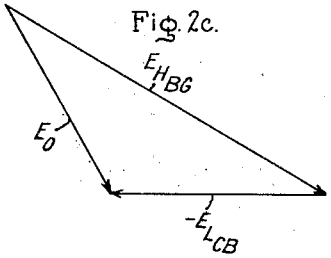

Referring now to Figs. 2a, 2b, and 2c, I have illustrated certain voltage vectors which represent the instantaneous voltage conditions on the circuit 10 upon the occurrence of a line-to-ground fault on phase conductor 13A of the portion of circuit 10 operated at high potential. This fault has been indicated as being one which causes the line-to-neutral potential of phase conductor 13A at the relaying point to become zero and without substantially changing the voltage triangle on the low potential portion of the circuit. In Fig. 2b for example $E_{H_{AG}}$, which is equal to zero, represents the instantaneous line-to-ground potential of phase conductor 13A, $E_{H_{BG}}$ represents the instantaneous line-to-ground potential of phase conductor 13B and $E_{H_{CG}}$ represents the instantaneous line-to-ground potential of phase conductor 13C. $E_{H_{AN}}$, $E_{H_{BN}}$, and $E_{H_{CN}}$ represent the corresponding undistorted line-to-neutral voltages respectively. It will be obvious that if a wye-broken-delta potential transformer were connected to transmission line 13, a zero sequence voltage quantity would be obtained across the broken delta winding having a magnitude and phase position equal to the vectorial sum of the voltage vectors $E_{H_{AG}}$, $E_{H_{BG}}$ and $E_{H_{CG}}$ or in other words, a zero sequence voltage quantity equal to three times the zero sequence voltage $E_0$ of the line 13 of the circuit 10.

Such a line-to-ground fault on phase conductor 13A of the high potential portion 13 of the circuit 10 causing substantially no distortion of the voltage triangle would cause the voltage quantities on the low potential portion 14 of the circuit to appear as indicated in Fig. 2a where $E_{L_{BA}}$ represents the line-to-line voltage between phase conductors 14B and 14A, $E_{L_{CB}}$ represents the line-to-line voltage between phase conductors 14c and 14B and $E_{L_{AC}}$ represents the line-to-line voltage between conductors 14A and 14c. As was mentioned above I have discovered that by subtracting from the line-to-ground potential $E_{H_{BG}}$ the potential $E_{L_{CB}}$ a potential $E_0$ as indicated in Fig. 2c is obtained having the same magnitude and phase position as the zero sequence voltage appearing on the high potential portion 13 of the alternating current circuit 10 being protected.

Figure 3A:
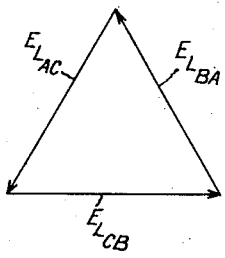
Figures 3B, 3C:
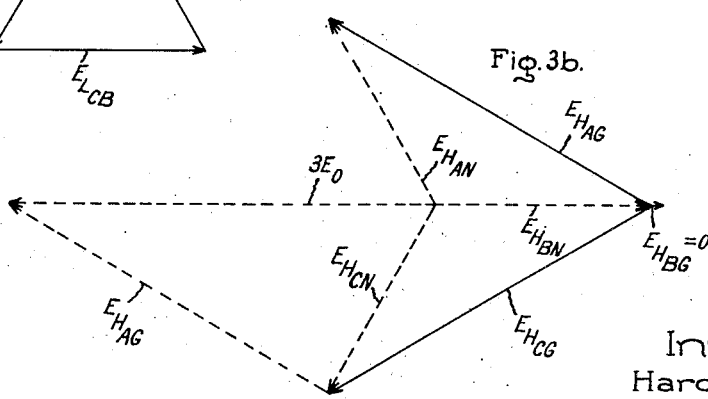

Similarly in Figs. 3a, 3b, and 3c the vector relationships between the voltages of the system upon the occurrence of a line-to-ground fault on phase conductor 13B are illustrated. By subtracting from the voltage quantity $E_{H_{BG}}$, which in this case is equal to zero, the voltage quantity $E_{L_{CB}}$ from Fig. 3a, a zero sequence voltage $E_0$ as indicated in Fig. 3c is obtained. This zero sequence voltage $E_0$ of Fig. 3c is proportional in magnitude and in phase to the zero sequence voltage existing in the high potential portion 13 of the polyphase alternating current circuit 10 under such a ground fault condition.

Figs. 4a, 4b, and 4c similarly illustrate the voltage vector relationships of the system of Fig. 1 when a line-to-ground fault exists on conductor 13c so as to cause the voltage from line to ground of conductor 13c to be zero. As in the previous example, a zero sequence voltage $E_0$ illustrated in Fig. 4c is obtained, having a magnitude and phase position proportional to the zero sequence voltage appearing on the high potential portion 13 of the protected polyphase alternating current circuit 10.

From the vector diagrams mentioned above, it is obvious that by merely providing one single phase high potential transformer 29 which may already be available and in certain cases an adjusting transformer 33, it is possible to obtain from circuit 10 without any additional equipment zero sequence voltage quantities for relaying purposes proportional to those existing on the high potential side of power transformer 15 from which by virtue of open delta potential transformer 22 only line-to-line potentials were heretofore obtainable therefrom. Accordingly, with the teachings of my invention a great saving in the cost of equipment for obtaining such additional relaying quantities from circuits already provided with phase fault protection is made possible. Since the cost of potential transformers greatly increases with increase in voltage, the arrangement described above for obtaining zero sequence voltages for ground fault protection greatly reduces the expense involved.

My invention is particularly useful for applications where a ground directional relay of the wattmetric type, such as 36 is used. Such a relay requires precise phase relationship or linear proportions between the ground potential quantity evolved and some other electrical quantity. With my arrangement a voltage proportional to the zero sequence voltage and having the same phase relationship is obtained in a very simple manner on systems provided with means for making only line-to-line voltage quantities available. The value of this zero sequence voltage will, of course, be one-third of the magnitude of the zero sequence voltage obtained from a wye-broken delta potential transformer where the zero sequence potentials which are the same in all three phases are added together giving a total zero sequence voltage of $3E_0$.

It will be understood by those skilled in the art that power transformer 15 could comprise a low potential wye-connected winding and a high potential delta connected winding instead of the reverse situation described above and the same relationships would be true. Of course, if the power transformer 15 comprises two wye-connected windings, then no difficulty in obtaining zero sequence quantities from the low potential portion of the circuit proportional to those existing on the high potential side of the circuit is encountered.

By a careful analysis of the protective system of Fig. 1 it will be observed that the potential in the portion of the low potential winding 16 of transformer 15 across which BC voltage is obtained is subtracted from the potential of the phase B winding of the high potential winding 17 of transformer 15. Since these two windings are closely coupled, it is obvious that the same currents when referred to either the high or low side of the transformer flow therein except for the zero sequence component which cannot appear at the terminals of the low potential side. Broadly, therefore, the zero sequence component is obtained by subtracting from the line-to-ground potential of the high potential side which contains the zero sequence component a corresponding potential of the low potential side which does not contain the zero sequence potential. In other words, in Fig. 1 I have effectively subtracted a line-to-neutral potential from the line-to-ground potential, which will produce the zero sequence component of voltage.

In Fig. 5 I have disclosed a similar protective system to that of Fig. 1 with the corresponding parts designated by the same reference numerals. However, instead of a power transformer 15 having one winding connected in delta and the other in wye or star relationship, both windings are connected in delta. Accordingly, in Fig. 5 I have illustrated a power transformer 42 having a delta-connected low potential winding 43 and a delta-connected high potential winding 44 which interconnect the high potential portion 13 and the low potential portion 14 of polyphase alternating-current circuit 10. As was mentioned above, if the line-to-neutral potential of the low potential side is subtracted from the corresponding line-to-ground potential of the high potential side with due consideration to the ratios of transformation, a resultant potential proportional to the zero sequence voltage existing on the high potential side will be obtained. Accordingly, in Fig. 5 I provide a transformer 45 having a wye-connected winding 46 which is connected to the respective terminals of the secondary windings of potential transformer 22 so as to establish an artificial neutral for the low potential portion 14 of alternating-current circuit 10. Wye-connected winding 46 is provided with the terminals 46A, 46B, and 46C corresponding to the respective phase conductors with which they are associated. Transformer 45 is also provided with a delta-connected secondary winding 47 including two terminals 47B and 47N which correspond to terminals 46B and the neutral of winding 46, the portions of these windings between the terminals mentioned being coupled closely.

The potential appearing across terminals 47B and 47N is the line-to-neutral potential of the phase conductor B of the low potential portion 14 of alternating-current circuit 10 which may be designated as $E_{L_{BN}}$. If this potential $E_{L_{BN}}$ is subtracted from the line-to-ground potential $E_{H_{BG}}$ of the high potential portion 13 of circuit 10 the zero sequence voltage $E_0$ existing on the high potential portion of the circuit will be obtained. Accordingly, the terminals 47B and 47N are connected across the winding 34 of adjusting transformer 33, the output of which is connected in series with the winding 31 of potential transformer 29 in the same manner as was described in connection with Fig. 1 above.

For a better understanding of the operation of the protective system of Fig. 5 reference may be had to Figs. 6a, 6b, 6c, 7a, 7b, 7c, 8a, 8b, and 8c which disclose the voltage vector relationships of the circuit. Upon the existence of a line-to-ground fault on phase conductor 13A of the high potential transmission line 13, which fault is sufficient to reduce the line-to-ground potential $E_{H_{AG}}$ of this faulted phase conductor to zero, as is indicated in Fig. 6b, the line-to-line potentials obtained at the terminals 27 of open-delta potential transformer 22 are clearly indicated in Fig. 6a with line-to-neutral potentials existing across the phases of wye-connected winding 46 of transformer 45 represented as $E_{L_{AN}}$, $E_{L_{BN}}$ and $E_{L_{CN}}$ respectively. Upon the existence of a line-to-ground fault on phase conductor A which is sufficient to decrease the voltage $E_{H_{AG}}$ to zero, the line-to-ground potentials of the other phase conductors may be represented by the voltage vectors $E_{H_{BG}}$ and $E_{H_{CG}}$, as shown in Fig. 6b. By subtracting the low potential voltage $E_{L_{BN}}$ from the high potential voltage $E_{H_{BG}}$, as shown in Fig. 6c, the zero sequence potential $E_0$ existing in transmission line 13 is obtained.

Similarly, Figs. 7a, 7b, and 7c disclose the voltage relationships of the protected circuit 10 upon the occurrence of a line-to-ground fault on phase conductor 13B which is sufficient to reduce the line-to-ground voltage $E_{H_{BG}}$ to zero. In this case the zero sequence voltage existing in transmission line 13 is equal to $-E_{L_{BN}}$ as is clearly indicated in Fig. 7c.

Figure 8A:
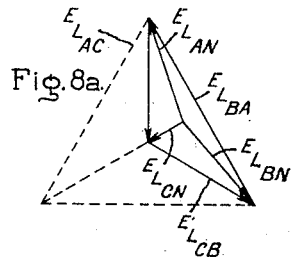
Figure 8B:
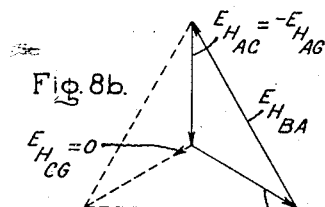
Figure 8C:
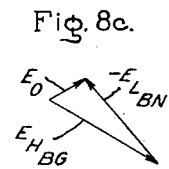

Figs. 8a, 8b, and 8c represent the vector relationships of the voltage quantities existing in protected circuit 10 upon the occurrence of a line-to-ground fault on phase conductor 13c sufficient to reduce the line-to-ground voltage $E_{H_{CG}}$ to zero, as is clearly indicated in Fig. 8b. The zero sequence potential existing in transmission line 13 indicated by $E_0$ in Fig. 8c is again obtained by subtracting from the potential $E_{H_{BG}}$ the potential $E_{L_{BN}}$.

The operation of the arrangement disclosed in Fig. 5 will be obvious to those skilled in the art in view of the detailed description included above.

Figure 9:
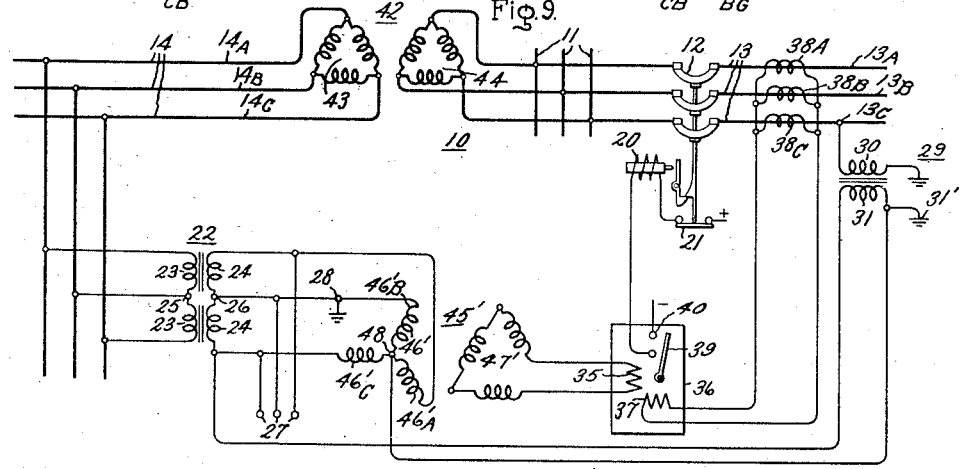

In Fig. 9 there is disclosed a modification of the protective system illustrated in Fig. 5 with the corresponding parts thereof designated by the same reference numerals as in Fig. 5. In this case the adjusting transformer 33 is eliminated and the line-to-ground potential of one phase conductor of the high potential portion 13 of alternating-current circuit 10 is vectorially added directly to the line-to-neutral potential obtained from the corresponding phase conductor of the low potential portion 14 of the circuit 10. It will be obvious that the difference between these potentials is equal to the zero sequence voltage component existing in portion 13 of circuit 10. Accordingly, in Fig. 9 I have disclosed a transformer 45' having a primary winding 46' which is connected in wye so as to establish an artificial neutral for the low potential portion 14 of alternating-current circuit 10. The terminals of winding 46' are respectively connected to the terminals of the secondary windings 24 of potential transformer 22. The terminals of the winding 46' are designated respectively as 46A', 46B' and 46C', while the neutral terminal of winding 46' is designated as 48. The secondary winding 31 of potential transformer 29, which in this case has one terminal of the primary winding 30 thereof connected to phase conductor 13c, is connected across the terminals 48 and 46c' of winding 46' of transformer 45' so as to introduce the zero sequence component existing from the high potential portion 13 of alternating-current circuit 10 into the winding 46' of transformer 45'. The secondary winding 47' of transformer 45' is connected in broken delta and the output thereof is of course three times the zero sequence voltage component introduced into winding 46' which is impressed across winding 35 of the electroresponsive device 36 in a manner well understood by those skilled in the art. In this case the vector relationships will be substantially those described in connection with Fig. 5, the only difference being in the means of vectorially adding the line-to-ground and corresponding line-to-neutral quantities.

Figure 10:
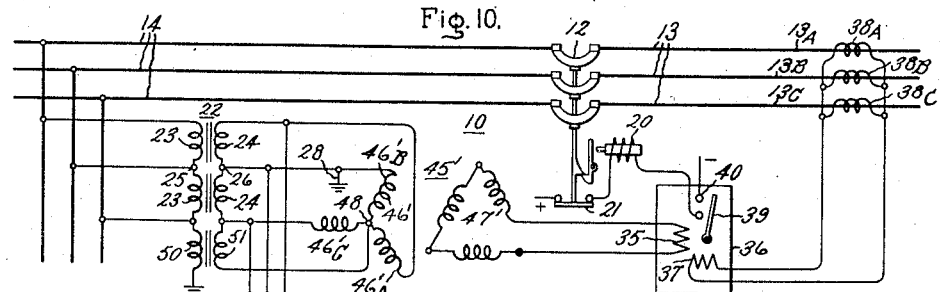

Although in the arrangements described thus far one portion of the circuit 10 was operated at a considerably higher potential than another portion thereof, my invention is also applicable to the protection of alternating-current circuits which are operated all at one potential. For example, in Fig. 10 I have disclosed an alternating-current circuit 10 which has one portion 13 directly connected to another portion 14, all operated at the same potential, through an electric circuit interrupting device 12. The corresponding parts of Fig. 10 are designated by the same reference numerals as in Fig. 9 above. To obtain the zero sequence potentials existing in circuit 10 it is merely necessary to add to potential transformer 22 which has already been provided and which in reality is two separate potential transformers, a third potential transformer having a primary winding 50 and a secondary winding 51. One terminal of the primary winding 50 is connected to ground, while the other terminal thereof is connected to the phase conductor C in the same manner as the primary winding 30 of transformer 29 of Fig. 9 except that in the case of Fig. 10 the potentials of all portions of circuit 10 are the same. The secondary winding 51 of the transformer which must be added to the potential transformer 22 is connected to the circuit in exactly the same manner as winding 31 of potential transformer 29 disclosed in Fig. 9. Accordingly, except for the position and connections of the transformer having primary winding 50 and secondary winding 51 the protective system of Fig. 10 is substantially identical with that of Fig. 9. It will be seen that the apparatus required for obtaining a zero sequence potential of Fig. 10 is the same as if potential transformer 22 were replaced by a wye-broken delta transformer. However, if the arrangement in Fig. 10 including potential transformer 22 was an existing installation with the terminals 27 connected to operate phase fault protective relays and also for metering purposes a considerable advantage is obtained with the arrangement of Fig. 10 which not only eliminates the requirement of reconnecting the windings of the potential transformer 22 but also does not change the burdens of the circuit with respect to metering as well as with respect to phase fault protection.

Figure 11:
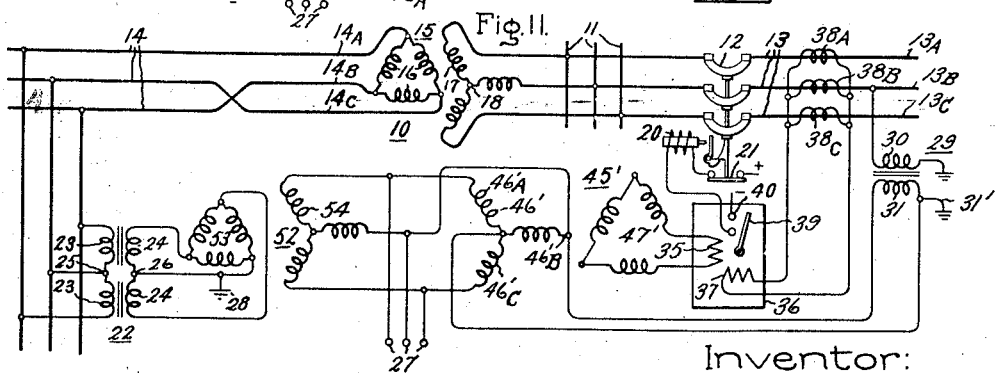

In Fig. 11 I have disclosed a protective system quite similar to Fig. 1 in which the corresponding parts are designated by the same reference numerals as in Fig. 1 in which a delta-wye potential transformer 52 is provided with the delta winding 53 connected to the output of potential transformer 22 so that line-to-neutral potentials across the star- or wye-connected winding 54 may be obtained proportional to the potentials existing across the winding 17 of power transformer 15 except for the presence of zero sequence components. The output of wye-connected winding 54 may then be impressed on a wye-broken delta transformer 45' identical with that disclosed in Figs. 9 and 10. With the potential obtained across winding 31 of potential transformer 29, which is the same as in Fig. 1, impressed on winding 46' of transformer 45' also in the same manner as in Fig. 9, the operation of the protective system disclosed in Fig. 11 will be obvious to those skilled in the art in view of the detailed description included above.

While I have shown and described certain particular embodiments of my invention, I do not desire my invention to be limited to the constructions shown and described for it will, of course, be obvious to one skilled in the art that changes and modifications may be made without departing from my invention. I therefore aim in the appended claims to cover all such changes and modifications as fall within the true spirit and scope of my invention.

What I claim as new and desire to secure by Letters Patent of the United States, is:

1. In a protective system for a polyphase alternating current circuit including an electric translating device interconnecting a portion of said circuit operated at a relatively high potential and a portion of said circuit operated at a lower potential, and a potential transformer of the open delta type for obtaining line to line potentials from said portion of said circuit operated at a lower potential, means for obtaining a zero sequence relaying quantity proportional to the zero sequence voltage of said portion of said circuit operated at a relatively high potential by vectorially adding a predetermined instantaneous line to ground potential of said portion of said circuit operated at a relatively high potential to a predetermined instantaneous line to line potential of said circuit operated at relatively low potential.

2. In a protective system for a polyphase alternating current circuit including an electric translating device interconnecting a portion of said circuit operated at a relatively high potential and a portion of said circuit operated at a lower potential, and a potential transformer of the open delta type for obtaining line to line potentials from said portion of said circuit operated at a lower potential, means for obtaining a zero sequence relaying quantity proportional to the zero sequence voltage of said portion of said circuit operated at a relatively high potential by vectorially adding a predetermined instantaneous line to ground potential of said portion of said circuit operated at a relatively high potential to a predetermined instantaneous potential of said circuit operated at relatively low potential.

3. In a protective system for a polyphase alternating current circuit including an electric translating device interconnecting a portion of said circuit operated at a relatively high potential and a portion of said circuit operated at a lower potential, and a potential transformer of the open delta type for obtaining line to line potentials from said portion of said circuit operated at a lower potential, means for obtaining a zero sequence relaying quantity proportional to the zero sequence voltage of said portion of said circuit operated at a relatively high potential by vectorially adding a predetermined instantaneous line to ground potential of said portion of said circuit operated at a relatively high potential to a predetermined instantaneous line to neutral potential of said circuit operated at relatively low potential.

4. In a protective system for a polyphase alternating current circuit having an open delta potential transformer means connected to said circuit for supplying line to line voltage quantities but which potential transformer means is incapable of supplying zero sequence voltage quantities, the combination of a single phase transformer having one terminal connected to a phase conductor of said circuit and another terminal connected to ground, and means including said open delta potential transformer means and said single phase transformer for obtaining zero sequence voltage quantities of said circuit.

5. In a protective system for a polyphase alternating current circuit having a potential transformer means connected to said circuit for supplying line to line voltage quantities but which potential transformer means are incapable of supplying zero sequence voltage quantities, the combination of a single phase transformer connected to said circuit so as to be energized with a predetermined line-to-ground potential of said circuit, and means including said potential transformer means and a secondary winding of said single phase transformer for obtaining zero sequence voltage quantities from said circuit.

6. In a protective system for a polyphase alternating current circuit including an electric translating device interconnecting a portion of said circuit operated at a relatively high potential and a portion of said circuit operated at a lower potential, said electric translating device comprising a power transformer having at least one delta-connected winding, and potential transformer means connected to said portion of said circuit operated at a lower potential for supplying only line to line voltage quantities, the combination of a single phase high potential transformer having one terminal connected to said portion of said circuit operated at a relatively high potential and the other terminal connected to ground, and means including said potential transformer means and said single phase transformer for obtaining zero sequence voltage quantities from said circuit proportional to the zero sequence voltage on the portion of said circuit operated at a relatively high potential.

7. In a protective system for a polyphase alternating current circuit including an electric translating device interconnecting a portion of said circuit operated at a relatively high potential and a portion of said circuit operated at a lower potential, said electric translating device comprising a power transformer having at least one delta-connected winding, and potential transformer means connected to said portion of said circuit operated at a lower potential for supplying only line-to-line voltage quantities, the combination of a single phase high potential transformer connected to said portion of said circuit operated at a relatively high potential, said single phase transformer being energized with a predetermined line-to-ground potential of said portion of said circuit operated at a relatively high potential, and means including said potential transformer means and said single phase transformer for obtaining zero sequence voltage quantities proportional to the zero sequence voltage on the portion of said circuit operated at a relatively high potential.

8. In a protective system for a polyphase alternating current circuit including an electric translating device interconnecting two portions of said circuit operated at different potentials, said electric translating device comprising a power transformer having at least one delta-connected winding, and a potential transformer connected to the low potential portion of said circuit for supplying only line-to-line voltage quantities, the combination of means for obtaining from said potential transformer a predetermined line-to-neutral potential of said low potential circuit, a single phase high potential transformer connected to said high potential portion of said circuit so as to be energized with a predetermined line-to-ground potential of said high potential portion of said circuit, and means for connecting said single phase transformer with said first mentioned means so that said predetermined line-to-ground potential is vectorially added to said predetermined line-to-neutral potential.

9. In a protective system for a polyphase alternating current circuit including an electric translating device interconnecting a portion of said circuit operated at a relatively high potential and a portion of said circuit operated at a lower potential, said electric translating device comprising a power transformer having two delta-connected windings, and a potential transformer connected to said portion of said circuit operated at a lower potential for supplying line-to-line voltage quantities, the combination of means for obtaining from said potential transformer a predetermined line to neutral potential of said circuit operated at a lower potential, and a single phase high potential transformer connected to said portion of said circuit operated at a relatively high potential so as to be energized with a predetermined line-to-ground potential of said portion of said circuit operated at a relatively high potential, said single phase transformer being connected with said first mentioned means so that said predetermined line-to-ground potential is vectorially added to said predetermined line-to-neutral potential.

10. In a protective system for a polyphase alternating current circuit including an electric translating device interconnecting two portions of said circuit operated at different potentials, said electric translating device comprising a power transformer having at least one delta-connected winding, and a potential transformer connected to the low potential portion of said circuit for supplying line-to-line voltage quantities but incapable of supplying a zero sequence voltage quantity, the combination of means comprising an auxiliary potential transformer having one winding connected in broken delta for obtaining from said potential transformer a predetermined line-to-neutral potential of said low potential circuit, and means for obtaining zero sequence voltage quantities proportional to the zero sequence voltage on the high potential portion of said circuit, comprising a single phase high potential transformer connected to said high potential portion of said circuit so as to be energized with a predetermined line-to-ground potential of said high potential portion of said circuit, said single phase transformer being connected with said first mentioned means so that said predetermined line-to-ground potential is vectorially added to said predetermined line-to-neutral potential.

11. In a protective system for a polyphase alternating current circuit including an electric translating device interconnecting two portions of said circuit operated at different potentials, said electric translating device comprising a power transformer having at least one delta-connected winding, a potential transformer connected to the low potential portion of said circuit for supplying only line-to-line voltage quantities, and means for obtaining from said potential transformer a predetermined line-to neutral potential of said low potential circuit, means for obtaining zero sequence voltage quantities proportional to the zero sequence voltage on the high potential portion of said circuit comprising a single phase high potential transformer connected to said high potential portion of said circuit so as to be energized with a predetermined line-to-ground potential of said high potential portion of said circuit, said single phase transformer being connected with said first mentioned means so that said predetermined line-to-ground potential is vectorially added to said predetermined line-to-neutral potential, and adjustable transformer means for relating said predetermined line-to-ground potential and predetermined line-to-neutral potential to the same reference.

12. In a protective system for a polyphase alternating current circuit including two portions, means for preventing zero sequence voltages occurring on one portion of said circuit from appearing on said other portion, and potential transformer means connected with one portion of said circuit for producing only voltages proportional to line-to-line voltages of said one portion, the combination of a single phase transformer associated with the other portion of said circuit and having one terminal connected to a phase conductor of said other portion of said circuit and another terminal connected to ground and means including said potential transformer means and said single phase transformer for obtaining zero sequence quantities from said circuit.

13. In a protective system for a polyphase circuit having two portions thereof so interconnected that a ground fault on one portion produces no zero sequence current in the other portion, the combination of a single phase transformer energized in response to the voltage between ground and one of the phase conductors of said one circuit portion, potential transformer means energized from said other circuit portion for producing only voltages proportional to the line-to-line voltages of said other circuit portion, and means for deriving from said single phase transformer and said potential transformer means a zero sequence quantity proportional to the zero sequence voltage of said one circuit portion.

14. In a protective system for a polyphase alternating current circuit including an electric translating device interconnecting a portion of said circuit operated at a relatively high potential and a portion of said circuit operated at a lower potential, and a potential transformer of the open delta type for obtaining line to line potentials from said portion of said circuit operated at a lower potential, the combination of a ground fault electroresponsive device of the wattmetric type having a plurality of windings, means for obtaining a zero sequence quantity for energizing one of said windings proportional to the zero sequence voltage of said portion of said circuit operated at a relatively high potential by vectorially adding a predetermined instantaneous line to ground potential of said portion of said circuit operated at a relatively high potential to a predetermined instantaneous line to line potential of said circuit operated at relatively low potential, and means for energizing the other winding of said electroresponsive device with a zero sequence current quantity obtained from said high potential portion of said circuit.

15. In a protective system for a polyphase alternating current circuit having a potential transformer means of the open delta type connected to said circuit for supplying line to line voltage quantities but which potential transformer means is incapable of supplying zero sequence voltage quantities, the combination of a ground fault electroresponsive device of the wattmetric type having a plurality of windings, a single phase transformer connected to said circuit, so as to be energized in response to the voltage between ground and a predetermined phase conductor of said circuit, means including said open delta potential transformer and said single phase transformer for obtaining a zero sequence quantity for energizing one of said windings which quantity is proportional to the zero sequence voltage of said circuit, and means for energizing the other winding of said electroresponsive device with a zero sequence current quantity obtained from said high potential portion of said circuit.

HAROLD T. SEELEY.